United States Patent
Hayashi et al.

(10) Patent No.: US 6,434,286 B2
(45) Date of Patent: Aug. 13, 2002

(54) OPTICAL SIGNAL SWITCHING APPARATUS

(75) Inventors: Yukio Hayashi, Fujisawa; Sunao Kakizaki, Kawasaki; Hideaki Tsushima, Komae; Shinichi Kuwano, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/772,083

(22) Filed: Jan. 30, 2001

(30) Foreign Application Priority Data

May 29, 2000 (JP) .................................... 2000-157922

(51) Int. Cl.[7] ................................................ G02B 6/26
(52) U.S. Cl. .............................. 385/15; 385/16; 385/24
(58) Field of Search ............................... 385/15, 16, 24

(56) References Cited

U.S. PATENT DOCUMENTS

| | | | |
|---|---|---|---|
| 5,760,936 A | * 6/1998 | Shirai | 359/128 |
| 5,995,689 A | * 11/1999 | Kuroshima | 385/24 |
| 6,144,786 A | * 11/2000 | Chethik | 385/24 |
| 6,324,318 B1 | * 11/2001 | Suzuki | 385/24 |

FOREIGN PATENT DOCUMENTS

| JP | 6-244796 | 9/1994 |
|---|---|---|
| JP | 2000-019471 | 1/2000 |

OTHER PUBLICATIONS

"Fiber Network Service Survivability", Artech House (1992), pp. 88–93.

* cited by examiner

*Primary Examiner*—John D. Lee
*Assistant Examiner*—Jennifer Doan
(74) *Attorney, Agent, or Firm*—Antonelli, Terry, Stout & Kraus, LLP (57) ABSTRACT

Variable (coupling ratio) optical couplers 3-0 and 6-0 each have ports of two inputs and two outputs, and the coupling ratio of inputted light is variably controlled by drive circuits 4-1 and 7-1. In the optical 1+1 switching structure, the coupling ratio of the variable (coupling ratio) optical coupler 3-0 is controlled to be 50%:50%. The variable (coupling ratio) optical coupler 6-0 is controlled to have the coupling ratio of 100%:0% or 0%:100%. In the optical 1:1 switching structure, the coupling ratios of the variable (coupling ratio) optical couplers 3-0 and 6-0 are controlled to be 100%:0% or 0%:100%. When a performance monitor (0) 9-0 detects signal degradation, signal interruption, and the like, the system controller 1-0 sends an instruction signal and the control circuits 20-0 and 21-0 output control signals for controlling coupling ratios of the variable (coupling ratio) optical couplers 3-0 and 6-0, respectively.

18 Claims, 6 Drawing Sheets

FIG.5
OPTICAL 1+1 (ONE FOR ONE) PROTECTION

OPTICAL SIGNAL SWITCHING APPARATUS

This application claims a priority based on Japanese Patent Application No. 2000-157922 filed on May 29, 2000, the entire contents of which are incorporated herein by reference for all purposes.

BACKGROUND OF THE INVENTION

The present invention relates to an optical signal switching apparatus, and particularly to an optical signal switching apparatus having an optical protection function.

First, structures for realizing an optical protection function, i.e., the optical 1+1 switching structure and the optical 1:1 switching structure will be described (See Japanese Unexamined Patent Laid-Open No. 6-244796 and Tong-Ho Wu, "Fiber Network Service Survivability", Artech House (1992), pp. 88–93).

Figure 5:
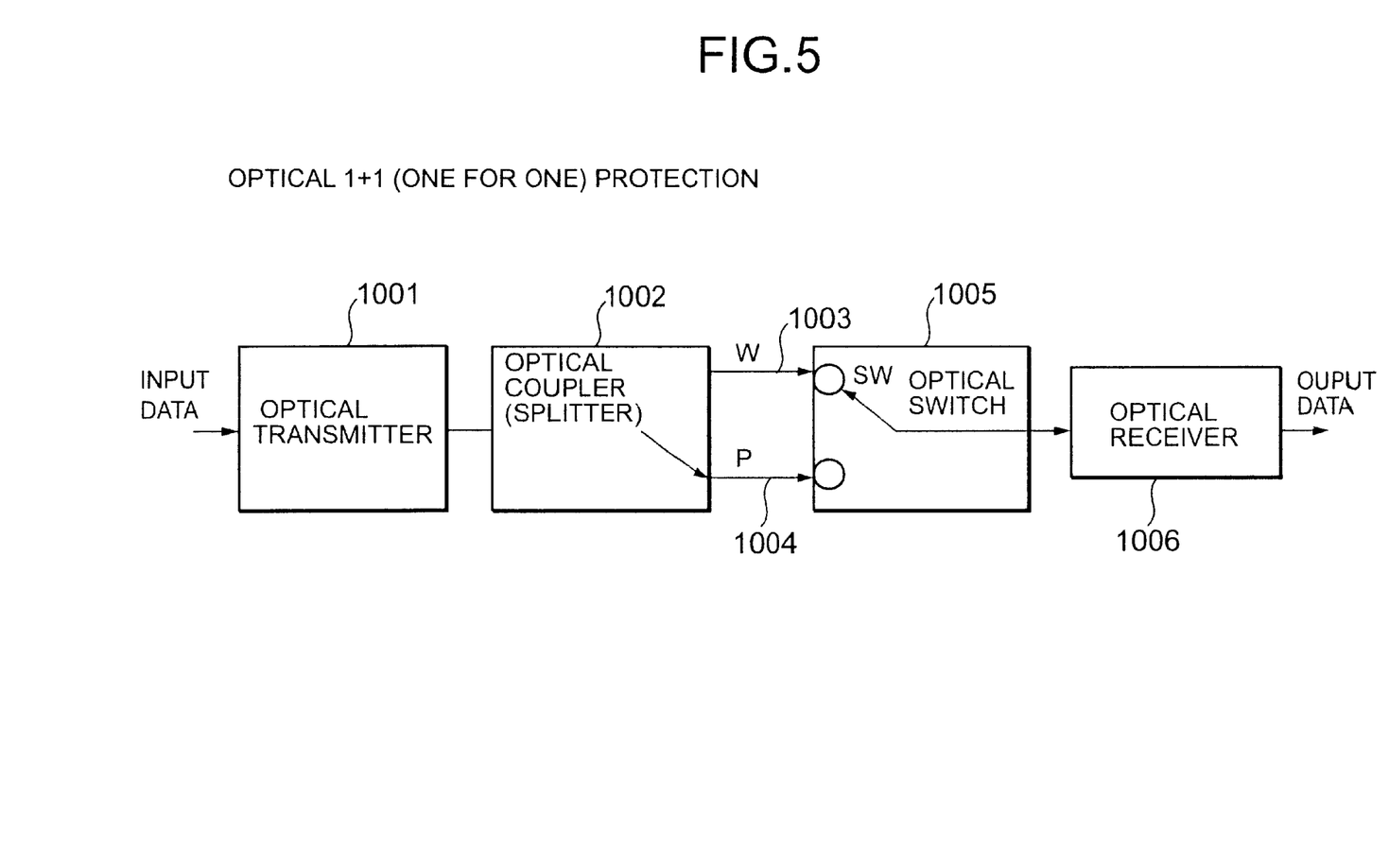
FIG. 5 is a block diagram of the conventional optical 1+1 switching structure.

FIG. 5 is a block diagram showing the conventional optical 1+1 switching structure. The optical 1+1 switching structure includes an optical transmitter 1001, an optical coupler (splitter) 1002, a working optical fiber 1003, a protection optical fiber 1004, an optical switch 1005, and an optical receiver 1006. On the transmitting side, an optical signal outputted from the optical transmitter 1001 is split by the optical coupler (splitter) 1002, and outputted to the working and protection optical fibers 1003 and 1004. On the receiving side, either of the working and protection optical fibers 1003 and 1004 is selected by the optical switch 1005, and the optical signal is received by the optical receiver 1006.

Figure 6:
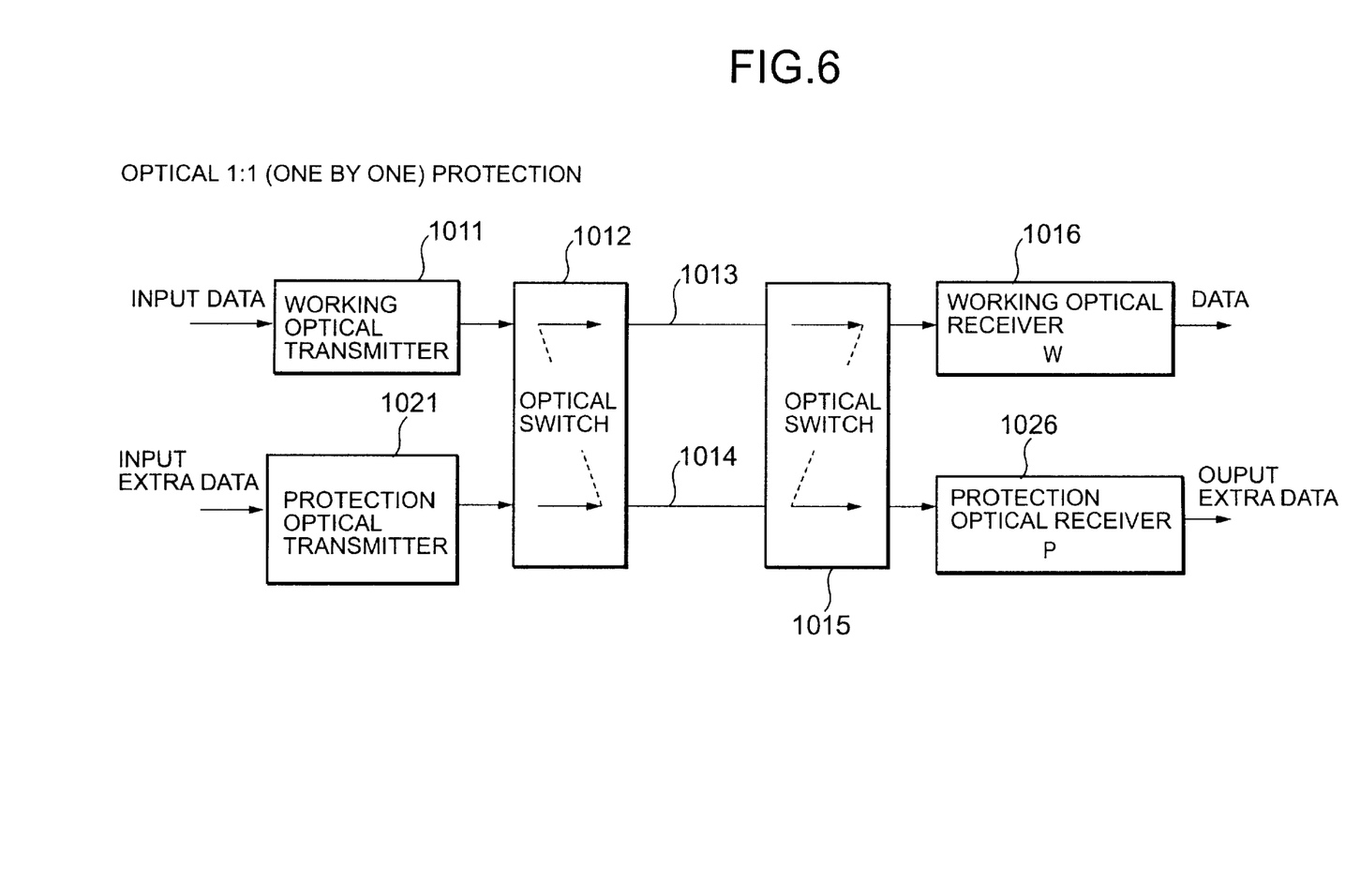
FIG. 6 is a block diagram of the conventional optical 1:1 switching structure.

FIG. 6 shows a block diagram showing the conventional optical 1:1 switching structure. The optical 1:1 switching structure includes a working optical transmitter 1011, a protection optical transmitter 1021, an optical switch 1012, a working optical fiber 1013, a protection optical fiber 1014, an optical switch 1015, a working optical receiver 1016, and a protection optical receiver 1026. On the working transmitting side, an optical signal (data) outputted from the working optical transmitter 1011 is switched by the optical switch 1012, and usually outputted to the working optical fiber 1013. On the working receiving side, the working optical fiber 1013 is selected by the optical switch 1015, and the optical signal is received by the working optical receiver 1016. On the other hand, also in the protection system, an optical signal (extra data) outputted from the protection optical transmitter 1021 is switched by the optical switch 1012, and usually outputted to the protection optical fiber 1014. The protection optical fiber 1014 is selected by the optical switch 1015, and the optical signal is received by the protection optical receiver 1026.

Further, in the case of trouble with the working optical fiber 1013, the optical switches 1012 and 1015 are switched so that data outputted from the working optical transmitter 1011 is received by the working optical receiver 1016 through the protection optical fiber 1014. In any case, the optical receivers 1006, 1016 and 1026 receive an optical signal and convert it to an electric signal.

In the above-described techniques, when the optical 1+1 switching structure is changed (expanded) to the optical 1:1 switching structure, it is necessary to replace the optical coupler (splitter) with the optical switch. Further, these switching structures tend to generate rapid fluctuation of optical power, at the time of switching optical signals (changeover of the optical switches). In particular, when an optical amplifier is connected in a subsequent stage to an optical switch, there may arise (a) excessive optical output (optical surge), or (b) effects (disturbances) on optical signals of other wavelengths at the time of general amplification of multiple wavelengths.

SUMMARY OF THE INVENTION

In consideration of the above problems, the present invention provides an optical signal switching apparatus whose hardware can be commonly used for the 1+1 switching structure (splitting on the sending side and switching on the receiving side) and the 1:1 switching structure (switching on the sending side and switching on the receiving side). Further, the present invention provides an optical signal switching apparatus that has sending-side and receiving side switches having the same structure, and thus is suitable for unifying and integrating sending and receiving components. Further, conventionally, an optical coupler should be replaced with an optical switch, and accordingly in-service transformation is difficult. On the other hand, according to the present invention, in-service transformation from the 1+1 switching structure to the 1:1 switching structure and in-service transformation from the 1:1 switching structure to the 1+1 switching structure are possible.

Further, according to the present invention, the control circuits are provided, and accordingly, it is possible to suppress rapid optical power fluctuation accompanying optical signal switching. In particular, the present invention can suppress (a) cause of excessive optical output (generation of optical surge), (b) effect (disturbance) on optical signals of other wavelengths at the time of general amplification of multiple wavelengths, etc. in an optical amplifier.

Further, conventionally, when generation of optical signal interruption (LOS) or the like is detected at the time of switching from working system to protection system, malfunction can occur. However, according to the present invention, switching can be performed without generating optical signal interruption.

In the present invention, in particular, a variable (coupling ratio) optical coupler is applied to a switch of an optical signal switching apparatus. At the time of the 1+1 switching structure, the sending side is made to have a splitting structure (coupling ratio=50%:50%) and the receiving side is made to have a switching structure (coupling ratio= 100%:0%, or 0%:100%). At the time of the 1:1 switching structure, the sending side is made to have a switching structure (coupling ratio=100%:0%, or 0%:100%) and the receiving side is made to have a switching structure (coupling ratio=100%:0%, or 0%:100%).

Further, the present invention can realize an optical signal switching function without rapid optical power fluctuation, by combining a variable (coupling ratio) optical coupler with a control circuit that gradually (continuously) controls the coupling ratio of the coupler.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Figure 1:
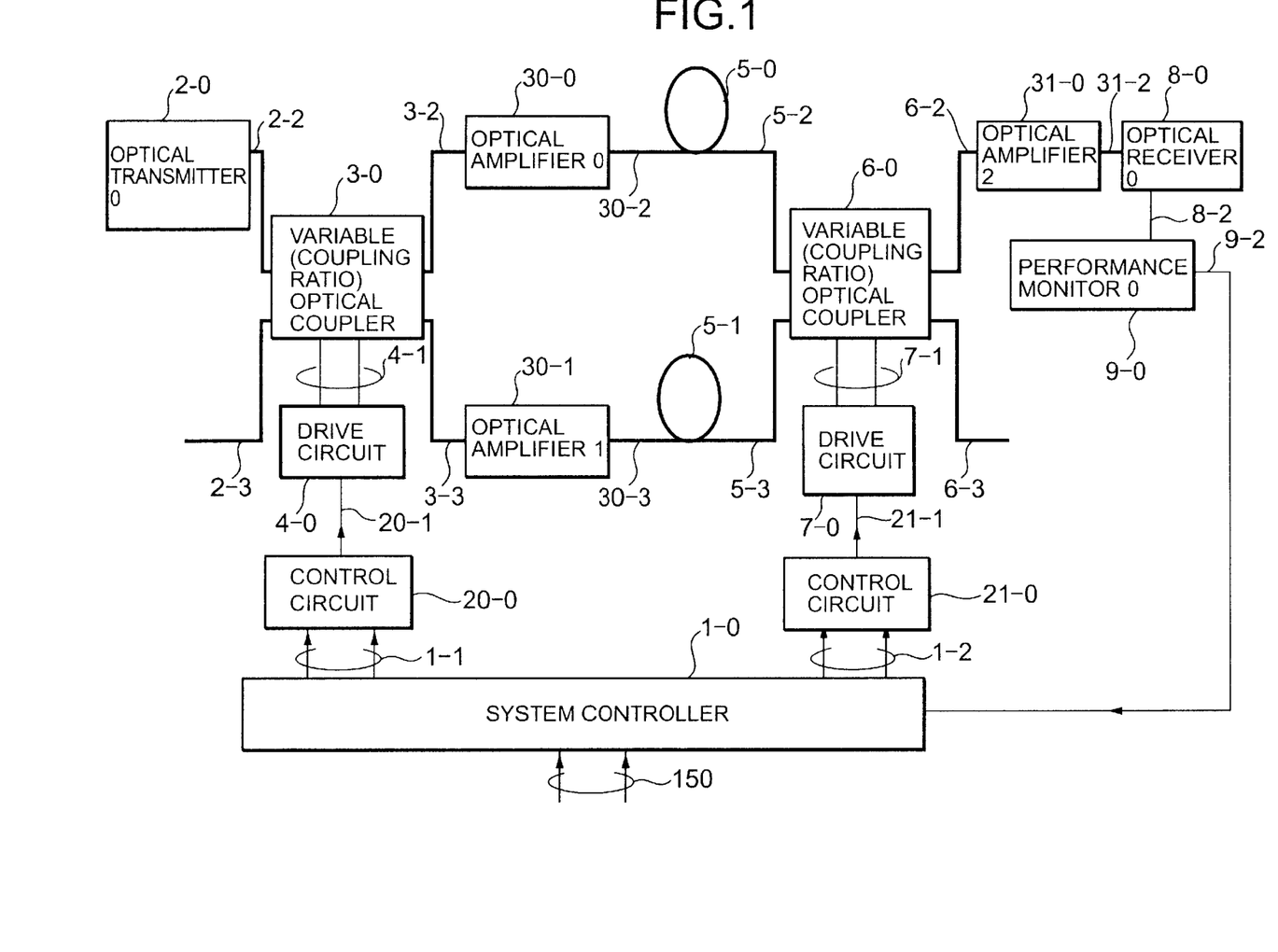
FIG. 1 is a block diagram of a 1+1 optical signal switching apparatus.

FIG. 1 is a block diagram of a 1+1 optical signal switching apparatus. The 1+1 optical signal switching apparatus comprises an optical transmitter (0) 2-0, a variable (coupling ratio) optical coupler 3-0, an optical amplifier (0) 30-0, an optical amplifier (1) 30-1, optical fibers 5-0 and 5-1, a variable (coupling ratio) optical coupler 6-0, an optical amplifier (2) 31-0, an optical receiver (0) 8-0, a performance monitor (0) 9-0, a system controller 1-0, control circuits 20-0 and 21-0, and drive circuits 4-0 and 7-0.

The optical transmitter (0) 2-0 converts an electric signal to an optical signal 2-2. Each of the variable (coupling ratio) optical couplers 3-0 and 6-0 has ports of two inputs (for example, IN1 and IN2) and two outputs (for example, OUT1 and OUT2), and the coupling ratio at which input light from the inputs IN1 or IN2 is outputted to the outputs OUT1 and OUT2 can be variably controlled by the drive circuit 4-0 or 7-0. For example, when the coupling ratio for input light from the input IN1 is OUT1:OUT2=100%:0%, the coupling ratio for input light from the input IN2 becomes OUT1:OUT2=0%:100%. Further, when the coupling ratio for input light from the input IN1 is OUT1:OUT2= 70%:30%, the coupling ratio for input light from the input IN2 becomes OUT1:OUT2=30%:70%. As the variable (coupling ratio) optical couplers 3-0 etc., may be used an optical element that has ports of at least two inputs and two outputs, and its optical coupling ratio between the input ports and the output ports can be variably controlled. As such an optical element, a directional coupler type optical switch using lithium niobate (LiNbO$_3$) as a medium for an optical waveguide (LN optical switch), a Mach-Zender interferometer type optical switch using a silica glass waveguide (Planar Light wave Circuit (PLC) optical switch), a Y-branch type optical switch using a polymer waveguide (polymer optical switch), and a micromachine type optical switch to which micromachine techniques are applied (Micro-Electro-Mechanical System (MEMS) optical switch) may be mentioned, for example. These are generally called optical switches, and can be applied to the variable (coupling ratio) optical coupler of the present invention. Japanese Unexamined Patent Laid-Open No. 2000-019471 describes application examples such as a variable optical attenuator and an optical power adjuster.

The optical 1+1 switching structure controls the coupling ratio of the variable (coupling ratio) optical coupler 3-0, so that the output ratio becomes OUT1:OUT2=50%:50%. Further, the variable (coupling ratio) optical coupler 6-0 outputs input light from the input IN1, so that the output ratio becomes OUT1:OUT2=100%:0% or OUT1:OUT2= 0%:100%. Similarly, input light from the input IN2 is outputted at the output ratio OUT1:OUT2=0%:100% or OUT1:OUT2=100%:0%. Thus, the variable (coupling ratio) optical coupler 6-0 is controlled in its coupling ratio such that one optical signal is selectively received (as an output signal 6-2 of the variable (coupling ratio) optical coupler) out of the optical fiber output signals 5-2 and 5-3. This function of the variable (coupling ratio) optical coupler 6-0 is equivalent to an optical switching function. When this system is used oppositely, the variable (coupling ratio) optical couplers 3-0 and 6-0 may be used integratedly on the sending and receiving side.

The optical amplifier (0) 30-0 optically amplifies a variable (coupling ratio) optical coupler output signal 3-2, and the optical amplifier (1) 30-1 optically amplifies a variable (coupling ratio) optical coupler output signal 3-3. The optical fibers 5-0 and 5-1 are optical fiber transmission lines, and may include wavelength multiplexers in addition to the optical fibers. The optical amplifier (2) 31-0 optically amplifies an optical signal propagated through the optical fiber transmission lines/lossy media. The optical receiver (0) 8-0 converts an optical signal to an electric signal 8-2. The performance monitor (0) 9-0 monitors performance of the received electric signal, constantly or periodically. As an example of the performance monitoring, a symbol error rate is monitored to detect signal degradation/signal interruption. Here, the monitored performance may include, for example, LOS (Loss of Signal), LOF (Loss of Frame), AIS (Alarm Indication Signal), BER (Bit Error Rate), etc. The system controller is advised of the detected performance monitor information as a performance monitor (information) signal 9-2. To the system controller 1-0, is inputted a system setup signal 150. The system setup signal sets, for example, the optical 1+1 switching structure or the optical 1:1 switching structure, and is determined by a system maintenance person/administrator, etc. In accordance with the system setup signal 150 inputted by the system maintenance person/administrator, the system controller 1-0 gives (transmits) setup information (instruction signals) 1-1 and 1-2 on the coupling ratios of the variable (coupling ratio) optical couplers 3-0 and 6-0 to the respective control circuits 20-0 and 21-0. Further, the system controller 1-0 monitors (receives) the performance monitor (information) signal 9-2 of the performance monitor (0) 9-0 that monitors the performance of the received signal. When signal degradation/interruption, etc. of the received signal is detected, the system controller 1-0 sends the control circuits 20-0 and 21-0 instruction signals 1-1 and 1-2 for switching from the main (working) optical transmission line to the spare (protection) optical transmission line, or from the spare optical transmission line to the main optical transmission line.

In accordance with the system controller output signal 1-1, the control circuit 20-0 outputs a control signal 20-1 for changing (controlling) the coupling ratio of the variable (coupling ratio) optical coupler 3-0. Similarly, in accordance with the system controller output signal 1-2, the control circuit 21-0 output a control signal 21-1 for changing (controlling) the coupling ratio of the variable (coupling ratio) optical coupler 6-0. In accordance with the control circuit output signal 20-1, the drive circuit 4-0 outputs a drive signal (drive circuit output signal) 4-1 for changing the coupling ratio of the variable (coupling ratio) optical coupler 3-0. In accordance with the control circuit output signal 21-1, the drive circuit 7-0 outputs a drive signal (drive circuit output signal) 7-1 for changing the coupling ratio of the variable (coupling ratio) optical coupler 6-0.

Next, flow of data will be described. On the transmitting side, an optical signal outputted from the optical transmitter (0) 2-0 is split by the variable (coupling ratio) optical coupler 3-0, to be outputted to the working and protection optical fibers 5-0 and 5-1. On the receiving side, either of the working and protection optical fibers 5-0 and 5-1 is selected by the variable (coupling ratio) optical coupler 6-0, and the selected optical signal is received by the optical receiver (0)8-0 through the optical amplifier (2) 31-0. The variable (coupling ratio) optical coupler 6-0 selects the optical fiber 5-0 at the working time, and selects the optical fiber 5-1 at the protection time.

Figure 2:
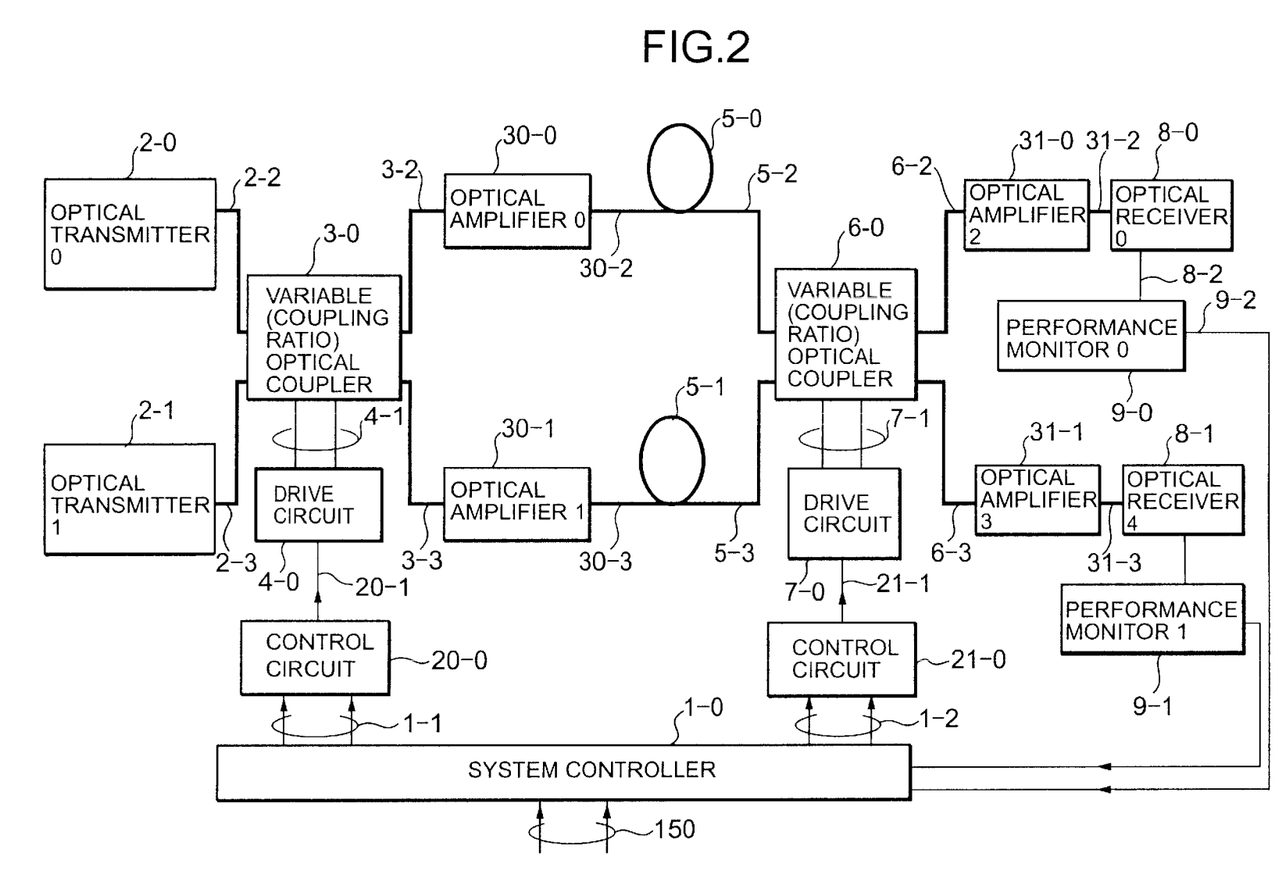
FIG. 2 is a block diagram of a 1:1 optical signal switching apparatus.

FIG. 2 is a block diagram of a 1:1 optical signal switching apparatus. The 1:1 optical signal switching apparatus comprises an optical transmitter (0) 2-0, an optical transmitter (1) 2-1, a variable (coupling ratio) optical coupler 3-0, an optical amplifier (0) 30-0, an optical amplifier (1) 30-1, optical fibers 5-0 and 5-1, a variable (coupling ratio) optical coupler 6-0, an optical amplifier (2) 31-0, an optical amplifier (3) 31-1, an optical receiver (0) 8-0, an optical receiver (1) 8-1, a performance monitor (0) 9-0, a performance monitor (1) 9-1, a system controller 1-0, control circuits 20-1 and 21-0, 0, and drive circuits 4-0 and 7-0.

Further, the system controller 1-0 monitors (receives) respective performance monitor (information) signals 9-2 and 9-3 of the performance monitors (0) 9-0 and (1) 9-1 that monitor performance of received signals. When degradation/interruption of the received signal is detected, the system controller 1-0 sends the control circuits 20-0 and 21-0 instruction signals 1-1 and 1-2 for switching from the main (working) optical transmission line to the spare (protection) optical transmission line, or from the spare optical transmission line to the main optical transmission line. The optical transmitters (0) 2-0 and (1) 2-1 convert an electric signal to an optical signal. The variable (coupling ratio) optical coupler 3-0 has ports of two inputs (for example, IN1 and IN2) and two outputs (for example, OUT1 and OUT2). In the optical 1:1 switching structure, input light from the input IN1 is controlled so that the coupling ratio becomes OUT1:OUT2=100%:0%, or 0%:100%. And, correspondingly, input light from the input IN2 is controlled so that the coupling ratio becomes OUT1:OUT2=0%:100%, or 100%:0%.

The variable (coupling ratio) optical coupler 6-0 has ports of two inputs (for example, IN1 and IN2) and two outputs (for example, OUT1 and OUT2). In the optical 1:1 switching structure, input light from the input IN1 is controlled so that the coupling ratio becomes OUT1:OUT2=100%:0%, or 0%:100%. And, correspondingly, input light from the input IN2 is controlled so that the coupling ratio becomes OUT1:OUT2=0%:100%, or 100%:0%.

The optical amplifiers (2) 31-0 and (3) 31-1 optically amplify optical signals propagated through the optical fiber transmission lines/lossy media. The optical receivers (0) 8-0 and (1) 8-1 convert optical signals to electric signals 8-2 and 8-3. The performance monitors (0) 9-0 and (1) 9-1 monitor performance of received electric signals constantly or periodically. As an example of the performance monitoring, a symbol error rate is monitored to detect signal degradation/ signal interruption. The system controller is advised of the detected performance monitor information as performance monitor (information) signals 9-2 and 9-3. The other configuration is similar to FIG. 1.

Next, flow of data will be described. On the transmission side of the working system, an optical signal (data) outputted from the working optical transmitter 2-0 is switched by the variable (coupling ratio) optical coupler 3-0 to be usually outputted to the working optical fiber 5-0. On the receiving side of the working system, the working optical fiber 5-0 is selected by the variable (coupling ratio) optical coupler 6-0, and the optical signal is received by the working optical receiver (0) 8-0 through the optical amplifier (2) 31-0. On the other hand, also in the case of the protection system, an optical signal (extra data) outputted from the protection optical transmitter (1) 2-1 is switched by the variable (coupling ratio) optical coupler 3-0 to be usually outputted to the protection optical fiber 5-1. The protection optical fiber 5-1 is selected by the variable (coupling ratio) optical coupler 6-0, and the optical signal is received by the protection optical receiver (1) 8-1 through the optical amplifier (3) 31-1. Further, in the case of trouble with the working optical fiber 5-0, the variable (coupling ratio) optical couplers 3-0 and 6-0 are switched so that data outputted from the working optical transmitter (0) 2-0 is transmitted to the protection optical fiber 5-1 and received by the working optical receiver (0) 8-0 through the optical amplifier (2) 31-0.

Figure 3:
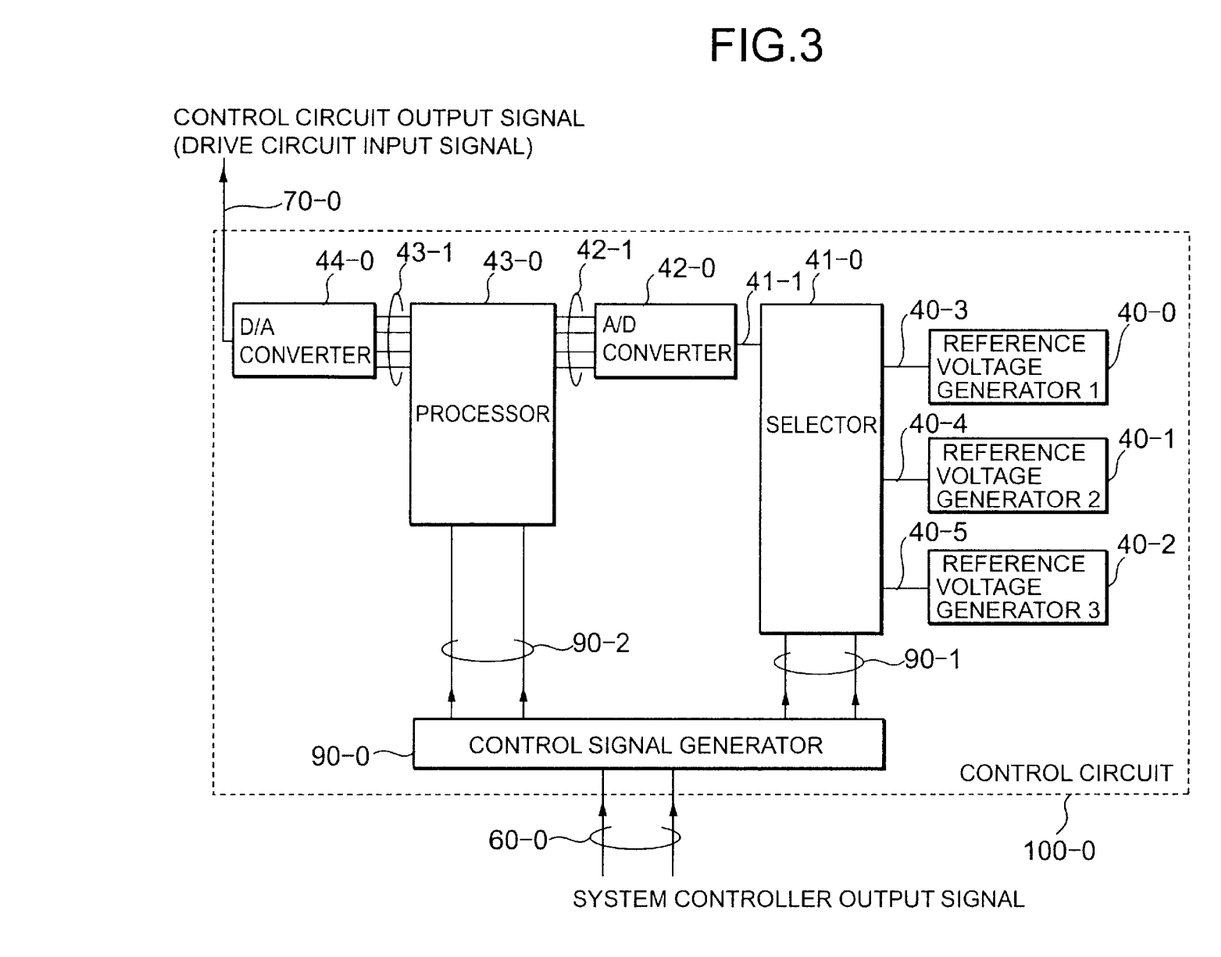
FIG. 3 is a block diagram showing a control circuit.

Next, FIG. 3 is a block diagram showing a control circuit. The control circuit 100-0 corresponds to the control circuit 20-0 or 21-0 of the above-mentioned 1+1 optical signal switching apparatus or 1:1 optical signal switching apparatus. The control circuit 100-0 comprises a control signal generator 90-0, a reference voltage generators (1) 40-0, (2) 40-1 and (3) 40-2, a selector 41-0, an A/D converter 42-0, a processor 43-0, and a D/A converter 44-0.

To the control signal generator 90-0, is inputted a system controller output signal 60-0 from the system controller 1-0. This signal corresponds to the system controller output signal 1-1 or 1-2 of FIGS. 1 or 2. The control signal generator 90-0 outputs a selector control signal 90-1 and an processor control signal 90-2 in accordance with the system controller output signal 60-0. The selector control signal 90-1 is a control signal for controlling selection/switching in the selector 41-0. On the other hand, the processor control signal 90-2 is a control signal for setting and controlling timing at which the processor starts the operation and for setting and controlling a time of controlling a coupling ratio of a variable (coupling ratio) optical coupler.

The reference voltage generator (1) 40-0 generates a reference voltage for obtaining a coupling ratio OUT1:OUT2=50%:50% of a variable (coupling ratio) optical coupler. The reference voltage generator (2) 40-1 generates a reference voltage for obtaining a coupling ratio OUT1:OUT2=100%:0% of a variable (coupling ratio) optical coupler. The reference voltage generator (3) 40-2 generates a reference voltage for obtaining a coupling ratio OUT1:OUT2=0%:100% of a variable (coupling ratio) optical coupler. These reference voltage generators from (1) 40-0 to (3) 40-2 may have a variable setting function with respect to their reference voltages (outputs), making their outputs adjustable. The selector 41-0 selects and outputs one of three reference voltage signals 40-3, 40-4 and 40-5, in accordance with the selector control signal 90-1. The A/D converter 42-0 converts the reference voltage signal (analog signal) selected by the selector to an n-bit digital signal. Here, the present invention may use suitable reference values, not limited to the reference voltages.

The processor 43-0 has the following functions.

(1) The processor 43-0 outputs (holds) a digital signal of the previous state.

(2) The processor 43-0 calculates a difference between an A/D converter output digital signal 42-1 (n bits), which corresponds to the next state, and a processor output digital signal 43-1 (n bits), which corresponds to the previous state, in accordance with the processor control signal 90-2. And, the processor 43-0 calculates and outputs successively and stepwise such that the processor output digital signal 43-1 coincides with the next state by m bits/T (period) each time. Further, by making it possible to variably set m bits and T (period), the times of controlling the coupling ratios of the variable (coupling ratio) optical couplers 3-0 and 6-0 can be set at any values. The D/A converter 44-0 converts the processor output digital signal 43-1 to an analog signal, to output a control circuit output signal (drive circuit input signal) 70-0. The control circuit output signal 70-0 corresponds to the control signal 20-1 or 21-1 of FIG. 1 or FIG. 2, and is inputted to the drive circuit 4-0 or 7-0.

Figure 4A:
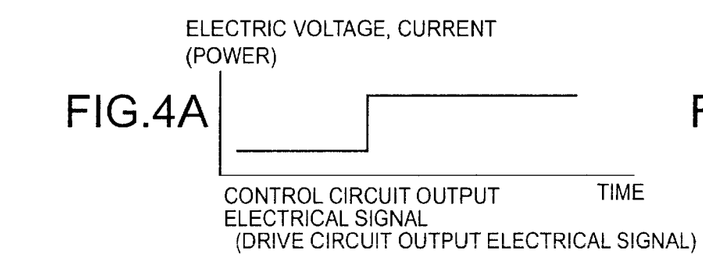
FIGS. 4A, 4B, 4C, 4D, 4E and 4F are an explanation of control operation by the control circuit.
Figure 4B:
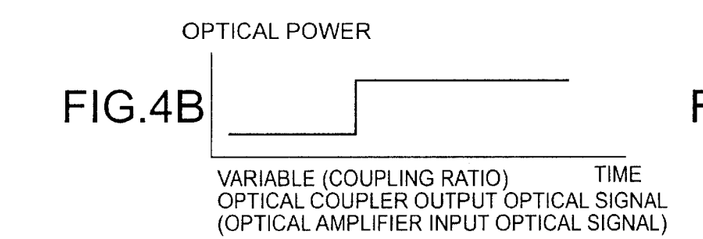
Figure 4C:
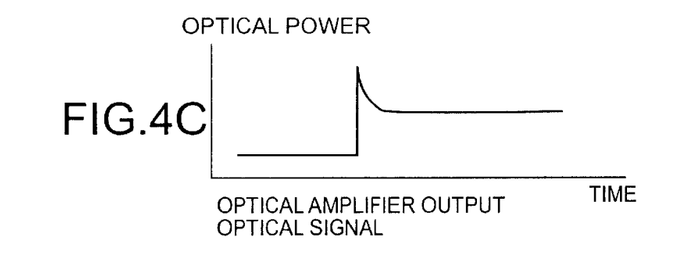
Figure 4D:
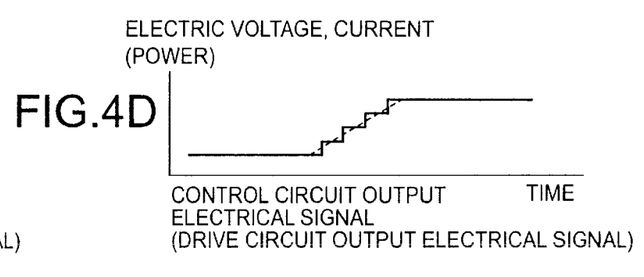
Figure 4E:
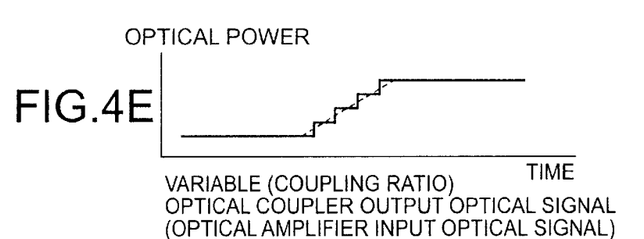
Figure 4F:
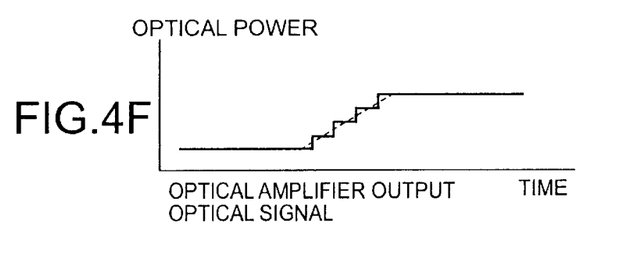

FIGS. 4A to 4F are an explanation of control operation by the control circuit. FIG. 4A shows a waveform of the control circuit output signals (drive circuit input signals) 70-0, 20-1, and 21-1 in the case that the control circuits 100-0, 20-0 and 21-0 do not exist, as in the conventional technique. In this case, at the time of switching, the output changes rapidly. FIG. 4B shows an optical waveform of the output of the variable (coupling ratio) optical couplers 3-0 and 6-0 (the input to the optical amplifiers 30-0, 30-1, 31-0 and 31-1 in FIG. 4A. FIG. 4C shows an output optical waveform of the optical amplifiers 30-0, 30-1, 31-0 and 31-1 in FIG. 4A. As shown in this figure, excessive optical output is generated in the conventional technique. FIG. 4D shows a waveform of the control circuit output signals (drive circuit input signals) 70-0, 20-1 and 21-1 in the case that the control circuits 100-0, 20-0 and 21-1 shown in FIG. 3 are provided. In this case, the output changes gradually at the time of switching. FIG. 4E shows an optical waveform of the output of the variable (coupling ratio) optical couplers 3-0 and 6-0 (the input to the optical amplifiers 30-0, 30-1, 31-0, 31-1) in FIG. 4D. FIG. 4F shows an output optical waveform of the optical amplifiers 30-0, 30-1, 31-0 and 31-1 in FIG. 4D. Thus, according to the present invention, occurrence of excessive optical output is suppressed at the time of switching.

As described above, the present invention can provide an optical signal switching apparatus whose hardware can be commonly used for the 1+1 switching structure (splitting on the sending side and switching on the receiving side) and the 1:1 switching structure (switching on the sending side and switching on the receiving side) for realizing the optical protection function. Further, the present invention can provide an optical signal switching apparatus that has sending-side and receiving-side switches having the same structure, and thus is suitable for unifying and integrating sending and receiving components. Further, conventionally, an optical coupler should be replaced with an optical switch, and accordingly in-service transformation is difficult. On the other hand, according to the present invention, in-service transformation from the 1+1 switching structure to the 1:1 switching structure and in-service transformation from the 1:1 switching structure to the 1+1 switching structure are possible. Further, according to the present invention, the control circuits are provided, and accordingly, it is possible to suppress rapid optical power fluctuation accompanying optical signal switching. In particular, the present invention can suppress (a) cause of excessive optical output (generation of optical surge), (b) effect (disturbance) on optical signals of other wavelengths at the time of general amplification of multiple wavelengths, etc. in an optical amplifier. Further, conventionally, when generation of optical signal interruption (LOS) or the like is detected at the time of switching from working system to protection system, malfunction can occur. However, according to the present invention, switching can be performed without generating optical signal interruption.

What is claimed is:

1. An optical switching apparatus comprising:
   a first optical transmitter that converts an electric signal to be transmitted to an optical signal;
   a first variable (coupling ratio) optical coupler having first and second input ports and first and second output ports, in which the optical signal outputted from said first optical transmitter is inputted to the first or second input port, and said first variable (coupling ratio) optical coupler outputs the optical signal inputted to the first or second input port, to the first and second output ports connected respectively to first and second optical transmission lines corresponding respectively to working and protection systems, at a first coupling ratio set by a first drive signal;
   a second variable (coupling ratio) optical coupler having third and fourth input ports and third and fourth output ports, in which the optical signal transmitted through the first and second optical transmission lines is inputted respectively to the third and fourth input ports, and the second variable (coupling ratio) optical coupler outputs the optical signal inputted to the third and fourth input ports, to the third and fourth output ports at a second coupling ratio set by a second drive signal;
   a first optical receiver that converts the optical signal received from the third output port of said second optical coupler, to an electrical signal;
   a first performance monitor that monitors performance of the electric signal received by said first optical receiver;
   a system controller that outputs instruction signals for switching or connecting said first and second optical transmission lines from the working system to the protection system or inversely, when degradation or interruption of the received signal is detected based on the performance detected by said first performance monitor;
   control circuits that output first and second control signals for controlling the first and second coupling ratios of said first and second optical couplers, based on the instruction signals received from said system controller, respectively; and
   drive circuits that output the first and second drive signals for instructing the first and second coupling ratios of said first and second optical couplers based on the first and second control signals received from said control circuits, respectively.

2. The optical signal switching apparatus according to claim 1, further comprising:
   a second optical receiver connected to the fourth output port of said second optical coupler; and
   a second performance monitor that monitors performance of an electric signal received by said second optical receiver; wherein,
   said system controller outputs the instruction signals based on the performances detected by said first and second performance monitors.

3. The optical signal switching apparatus according to claim 2, wherein:
   the performance monitored by said first or second performance monitor is a symbol error rate, signal degradation, or signal interruption.

4. The optical signal switching apparatus according to claim 2, wherein:
   each of said control circuits comprises:
      reference value generators for generating a plurality of reference values used for setting the coupling ratios of said first and second optical couplers correspondingly to first and second states;
      a selector that selects one of the reference values generated by said reference value generators, in accordance with a selector control signal;
      a processor for calculating the first or second control signal for gradually changing the first or second coupling ratio at which an input from each input port is outputted to the output ports of the first or second optical coupler when the first state changes into the second state, said calculation being performed in accordance with a processor control signal; and a control signal generator that outputs the selector control signal for controlling said selector's selection of the reference value to said selector and the processor control signal for controlling a time and quantity of change when the first or second coupling ratio is changed to said processor, in accordance with the instruction signal from said system controller.

5. The optical signal switching apparatus according to claim 4, wherein:
said reference value generators further have a variable reference value setting function.

6. The optical signal switching apparatus according to claim 4, wherein:
said reference value generators generate at least three reference values for setting the coupling ratio between the first output port and the second output port to 100%:0%, 0%:100%, and 50%:50%.

7. The optical signal switching apparatus according to claim 2, wherein:
an optical amplifier is provided in a stage subsequent to said first optical coupler and/or a stage subsequent to said second optical coupler.

8. The optical signal switching apparatus according to claim 2, wherein:
in optical 1+1 switching structure, and with respect to said first optical coupler, said drive circuits and/or said control circuits control the coupling ratio of an optical signal inputted to the first input port to be "the first output port:the second output port=50%:50%.

9. The optical signal switching apparatus according to claim 2, wherein:
in an optical 1:1 switching structure, and with respect to said first optical coupler,
in the first state, said drive circuits and/or said control circuits control the coupling ratio of an optical signal inputted to the first input port to be "the first output port:the second output port=100%:0%", and control the coupling ratio of an optical signal inputted to the second input port to be "the first output port:the second output port=0%:100%", and
on the other hand, in the second state, said drive circuits and/or said control circuits control the coupling ratio of an optical signal inputted to the first input port to be "the first output port:the second output port=0%:100%", and control the coupling ratio of an optical signal inputted to the second input port to be "the first output port:the second output port=100%:0%".

10. The optical signal switching apparatus according to claim 2, wherein:
in an optical 1+1 switching structure and an optical 1:1 switching structure, and with respect to said second optical coupler,
in the first state, said drive circuits and/or said control circuits control the coupling ratio of an optical signal inputted to the third input port to be "the third output port:the fourth output port=100%:0%"; and
on the other hand, in the second state, said drive circuits and/or said control circuits control the coupling ratio of an optical signal inputted to the third input port to be "the third output port:the fourth output port=0%:100%".

11. The optical signal switching apparatus according to claim 1, wherein:
the performance monitored by said first or second performance monitor is a symbol error rate, signal degradation, or signal interruption.

12. The optical signal switching apparatus according to claim 1, wherein:
each of said control circuits comprises:
reference value generators for generating a plurality of reference values used for setting the coupling ratios of said first and second optical couplers correspondingly to first and second states;
a selector that selects one of the reference values generated by said reference value generators, in accordance with a selector control signal;
a processor for calculating the first or second control signal for gradually changing the first or second coupling ratio at which an input from each input port is outputted to the output ports of the first or second optical coupler when the first state changes into the second state, said calculation being performed in accordance with a processor control signal; and
a control signal generator that outputs the selector control signal for controlling said selector's selection of the reference value to said selector and the processor control signal for controlling a time and quantity of change when the first or second coupling ratio is changed to said processor, in accordance with the instruction signal from said system controller.

13. The optical signal switching apparatus according to claim 12, wherein:
said reference value generators further have a variable reference value setting function.

14. The optical signal switching apparatus according to claim 12, wherein:
said reference value generators generate at least three reference values for setting the coupling ratio between the first output port and the second output port as 100%:0%, 0%:100%, and 50%:50%.

15. The optical signal switching apparatus according to claim 1, wherein:
an optical amplifier is provided in a stage subsequent to said first optical coupler and/or a stage subsequent to said second optical coupler.

16. The optical signal switching apparatus according to claim 1, wherein:
in optical 1+1 switching structure, and with respect to said first optical coupler,
said drive circuits and/or said control circuits control the coupling ratio of an optical signal inputted to the first input port to be "the first output port:the second output port=50%:50%.

17. The optical signal switching apparatus according to claim 1, wherein:
in an optical 1:1 switching structure, and with respect to said first optical coupler,
in the first state, said drive circuits and/or said control circuits control the coupling ratio of an optical signal inputted to the first input port to be "the first output port:the second output port=100%:0%", and control the coupling ratio of an optical signal inputted to the second input port to be "the first output port:the second output port=0%:100%", and
on the other hand, in the second state, said drive circuits and/or said control circuits control the coupling ratio of an optical signal inputted to the first input port to be "the first output port:the second output port=0%:100%", and control the coupling ratio of an optical signal inputted to the second input port to be "the first output port:the second output port=100%:0%".

18. The optical signal switching apparatus according to claim 1, wherein:

in an optical 1+1 switching structure and an optical 1:1 switching structure, and with respect to said second optical coupler, in the first state, said drive circuits and/or said control circuits control the coupling ratio of an optical signal inputted to the third input port to be "the third output port:the fourth output port=100%:0%"; and on the other hand, in the second state, said drive circuits and/or said control circuits control the coupling ratio of an optical signal inputted to the third input port to be "the third output port:the fourth output port 0%:100%".

* * * * *